Figure 1:
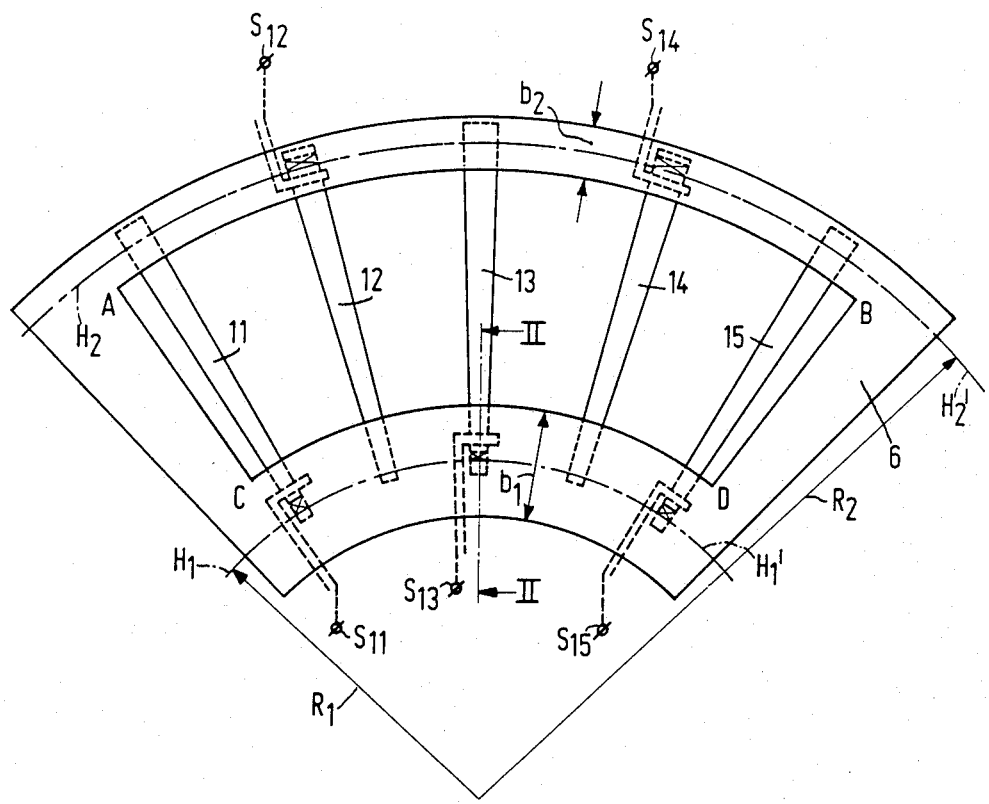

United States Patent [19]

Pelgrom et al.

[11] Patent Number: 4,766,307
[45] Date of Patent: Aug. 23, 1988

[54] SEMICONDUCTIVE RADIAL PHOTODETECTOR AND APPARATUS COMPRISING SUCH A DETECTOR

[75] Inventors: Marcellinus J. M. Pelgrom, Eindhoven; Jan G. Dil, Almelo, both of Netherlands

[73] Assignee: U.S. Philips Corporation, New York, N.Y.

[21] Appl. No.: 924,230

[22] Filed: Oct. 28, 1986

[30] Foreign Application Priority Data

Nov. 1, 1985 [NL] Netherlands ............... 8502988

[51] Int. Cl.$^4$ .......................................... G01D 5/34
[52] U.S. Cl. ............................ 250/231 SE; 250/211 J; 250/237 R
[58] Field of Search .......... 250/231 SE, 211 J, 237 G, 250/237 R; 340/347 P; 356/375

[56] References Cited

U.S. PATENT DOCUMENTS

| | | | |
|---|---|---|---|
| 3,531,650 | 9/1970 | Cronin | 250/237 G |
| 3,757,128 | 9/1973 | Vermeulen | 250/237 G |
| 3,973,119 | 8/1976 | Renes et al. | 250/237 G |
| 4,373,816 | 2/1983 | Laib | 250/237 G |
| 4,577,101 | 3/1986 | Bremer et al. | 250/231 SE |
| 4,654,524 | 3/1987 | Kita | 250/231 SE |
| 4,658,132 | 4/1987 | Nishiura et al. | 250/231 SE |
| 4,658,133 | 4/1987 | Nishiura | 250/231 SE |

Primary Examiner—Edward P. Westin
Assistant Examiner—Khaled Shami
Attorney, Agent, or Firm—Paul R. Miller

[57] ABSTRACT

A photodetector for use in an angular displacement measuring apparatus consists a multiple photocell consisting of radially extending strip-shaped photodiodes (11 to 15). According to the invention, the diodes are connected alternately via switching electrodes (7) to an output electrode (6), which is constituted by a conductive image-defining shield arranged above the switching electrodes and comprises two opposite bands (AB, CD), whose widths ($b_1$, $b_2$) are substantially inversely proportional to their radii of curvature in order to reduce trouble by cross-talk. The photodetector may be an integrated circuit, which comprises besides the multiple photocell also a part of the processing circuit. The invention also relates to an apparatus for measuring angular displacements by means of such a photodetector.

6 Claims, 2 Drawing Sheets

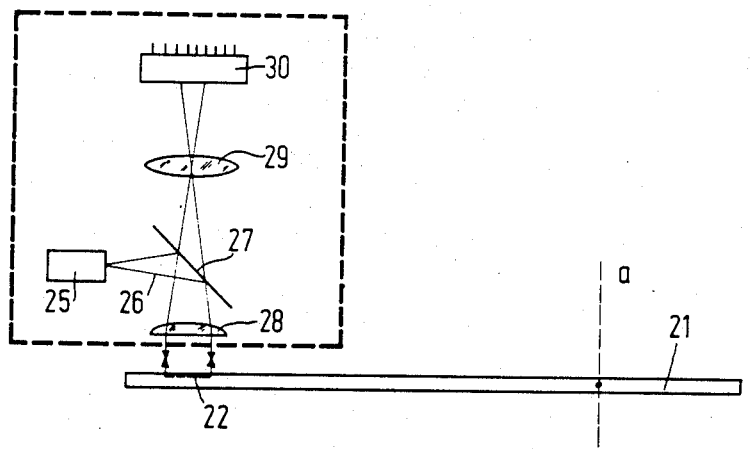
FIG.3
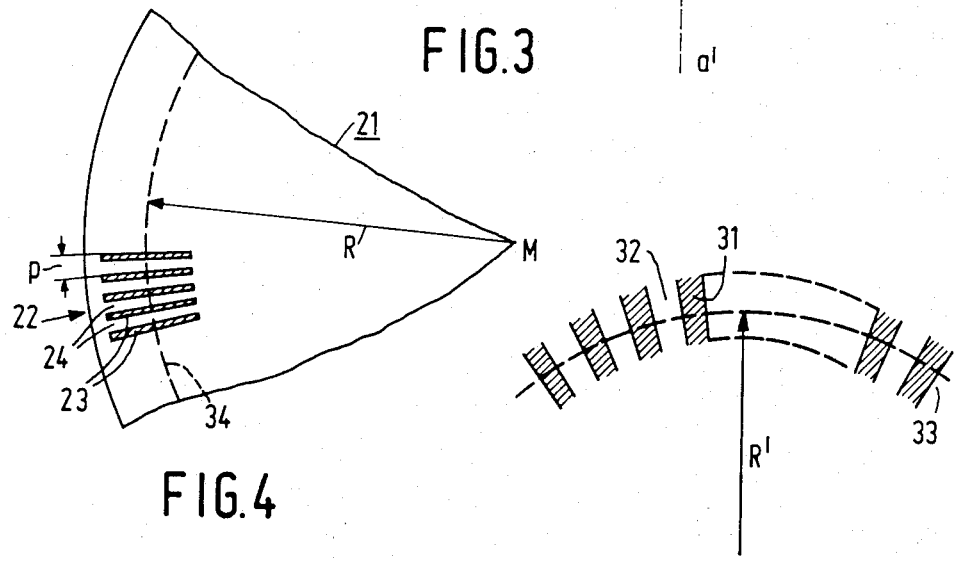
FIG.4
FIG.5
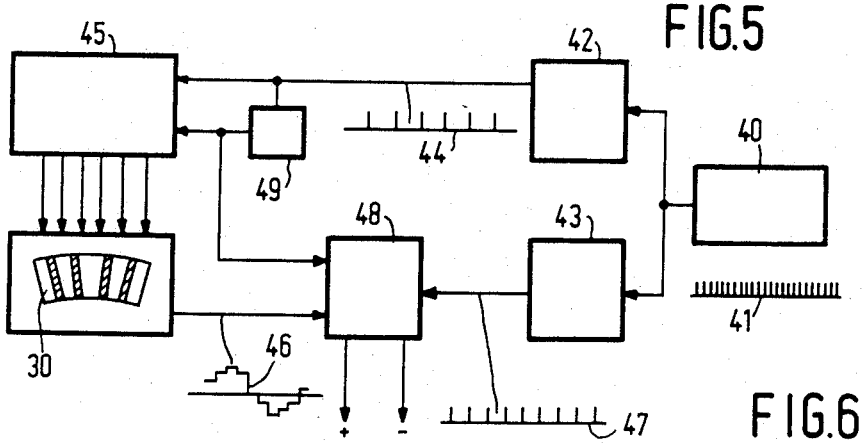
FIG.6

SEMICONDUCTIVE RADIAL PHOTODETECTOR AND APPARATUS COMPRISING SUCH A DETECTOR

The invention relates to a photodetector suitable for use in an angular displacement measuring apparatus and having a semiconductor region of a first conductivity type, in which a plurality of strip-shaped photodiodes are provided comprising zones of the second opposite conductivity type which form pn junctions with the region of the first conductivity type with the ends of the photodiodes being located on two concentric arcs of a circle and the longitudinal sides of the photodiodes extending in the radial direction, while in the tangential direction the photodiodes are located at regular relative distances and consecutive photodiodes are connected alternately at one and the other end to an output electrode with an image-defining shield impervious to radiation being arranged above the photodiodes, which shield covers the ends of the photodiodes and has an opening within which the photodiodes are mainly located and of which two opposite edges are concentric with the arcs of a circle.

A photodetector of the kind described above is known from British Patent Specification No. 1,406,902, corresponding to U.S. Pat. No. 3,757,128.

Such photodetectors, also designated as a multiple photocell, are used more particularly in equipment for measuring angular displacements, which can be used in various applications, for example, for measuring and controlling speeds of rotation (tachometers), angular measurement apparatus used in X-ray crystallography, and apparatus generally for measuring and/or regulating the angular displacement of an object.

The angular displacement of an object can be measured by imaging a pattern of radially extending strips designated hereinafter as the radial strip pattern, connected to the object, on a reference strip pattern constituted by a multiple photocell. The photocell comprises a plurality of photodiodes and switching electrodes connecting the photodiodes to an electronic processing circuit according to a given program. Thus, it is achieved that a "reference strip pattern" apparently travels over the surface of the multiple photocell. Thus a dynamic detection, substantially independent of environmental influences, is possible while moreover the direction of the displacement can be measured. The dynamic detection is realized without the use of a separate strip pattern and moving parts for imparting a uniform movement to this pattern so that a displacement sensor comprising a multiple photocell is of simple construction and is highly resistant to vibrations. An angular displacement measurement apparatus of this kind is described in the published European Patent Application EP No. 96448, corresponding to U.S. Pat. No. 4,577,101.

For use in such an apparatus, a multiple photocell comprising radially extending photodiodes of the kind known from British Patent Specification No. 1,406,902 is particularly suitable because in this case the photodiodes can be arranged in accordance with the image of the also radially extending measurement disk strips in the plane of the photodetector. In contrast with the linear detector used in the aforementioned European Patent Application EP No. 96448, in which the photodiodes are arranged according to parallel lines, in this case no additional optical elements to be accurately aligned need be used for converting the image of the radial measurement strip pattern on a linear photodiode pattern. Since the electrical limitation of the photodiodes is determined by the switching or gate electrodes, the latter have to be located below the optical limitation, i.e. below the shield. The image-defining shield can then be constructed as a conductive layer and can be used as the output electrode, while the switching electrodes can be arranged below it (and so as to be electrically insulated from it). However, it has been found that the capacitance, especially that between the gate electrodes and the output electrode then leads to a noticeable cross-talk of the gate electrode signals to the output signal.

These cross-talk capacitances are found to be particularly disturbing if they are different for photodiodes which are not connected at the same end to the output electrodes.

The invention has inter alia for its object to provide a photodetector which comprises a multiple photocell with photodiodes to be contacted via a switching signal, which photodiodes extend in the radial direction, and whose construction is very compact, while trouble due to the disturbance by cross-talk capacitances is reduced as far as possibe.

According to the invention, a photodetector of the kind described in the opening paragraph is characterized in that the shield is constituted by a conductive layer which serves as the output electrode and whose parts adjoining the opposite edges form bands of uniform width, whose widths have a ratio substantially inversely proportional to that of the radii of curvature of their center lines, and in that each photodiode is connected to the output electrode via a field effect transistor having an insulated gate electrode which is located below the output electrode.

The invention further relates to an apparatus for measuring angular displacements of an object by means of a measuring disk which is mechanically connected to the object and is provided with a pattern of first strips which extend in the radial direction and which in the tangential direction alternate with second strips with the first and second strips having different optical properties, which apparatus comprises a radiation source for illuminating the strip pattern and a photodetector for converting radiation originating from the strip pattern into electrical signals with the photodetector comprising a multiple photocell consisting of a plurality of photodiodes which are connected (consecutively) by means of an electronic switch to an electronic circuit for processing the detector signals, characterized in that a photodetector is used according to the invention as described above.

Figure 2:
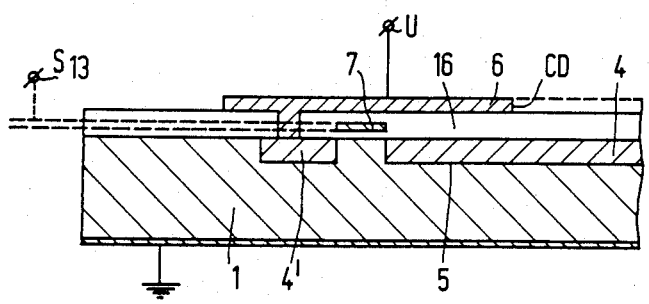

The invention will now be described more fully with reference to a few embodiments by way of example, and the drawing, in which:

FIG. 1 shows diagrammatically in plan view a part of a photodetector in accordance with the invention, FIG. 2 shows diagrammatically in cross-section the photodetector shown in FIG. 1 taken on the line II—II, FIG. 3 shows diagrammatically an angular displacement measurement apparatus in accordance with the invention, FIGS. 4 and 5 show details of the apparatus shown in FIG. 3, and FIG. 6 shows a block circuit diagram of a processing circuit associated with the apparatus shown in FIG. 3.

The Figures are schematic and are not drawn to scale. Corresponding parts are generally designated by the same reference numerals.

FIG. 1 shows diagrammatically in plan view and FIG. 2 shows diagrammatically in cross-section taken on the line II—II a part of a photodetector in accordance with the invention. The photodetector comprises a semiconductor region 1 of a first conductivity type, which in this embodiment the n conductivity type, although this region may also be a p-type region. In this n-type region 1 are provided a plurality of identical strip-shaped photodiodes, of which for the sake of clarity only five (11 to 15) are shown in this embodiment. In reality the number of these photodiodes is considerably larger, for example about two hundred. FIG. 2 shows a cross-section of the photodiode 13. The diode comprises a zone 4 of the second (in this case, therefore, p) conductivity type, which forms a pn junction 5 with the region 1. The ends of the photodiodes 11 to 15 are disposed on two concentric arcs of a circle with the longitudinal sides of the photodiodes extending in the radial direction (see FIG. 1). The diodes are arranged in the tangential direction, i.e. in the direction transverse to their longitudinal direction, at regular relative distances, while they are connected alternately at one and at the other end to an output electrode, as will be explained more fully hereinafter. The region 1 is connected to a reference potential, for example, to ground.

There is arranged above the photodiodes an image defining shield 6 which is impervious to the incident radiation, covers the ends of the photodiodes, and defines the part of the photodiodes accessible to radiation, in order to avoid undesired edge signals. The shield 6 has an opening ABCD, within which the photodiodes are mainly located and of which two opposite edges, AB and CD, are concentric with arcs of a circle.

In accordance with the invention, the element 6 is constituted by a conductive layer serving as the output electrode, for example, an aluminium layer, of which the parts adjoining the opposite edges AB and CD form bands of uniform width, whose widths ($b_1$, $b_2$) have a ratio substantially inversely proportional to that of the radii of curvature ($R_1$, $R_2$) of their center lines ($H_1$, $H_1'$ and $H_2$, $H_2'$). See FIG. 1, in which on account of what has been stated above;

$b_1/b_2$ is approximately equal to $R_2/R_1$.

Furthermore, according to the invention, each photodiode is connected via a field effect transistor to the output electrode 6 by means of switching signals ($S_{11}$–$S_{15}$) at a gate electrode 7 located below the output electrode 6. See FIG. 2 where the zone 4 has an interruption with the part 4' being connected via a contact window 8 (indicated by diagonal lines in FIG. 1) to the output electrode 6. The parts 4 and 4' constitute source and drain zones of field effect transistor having an insulated gate electrode 7, which is connected to the switching voltage $S_{13}$. When the correct value is chosen for this switching voltage, an inversion channel is formed at the surface in known manner in the relevant photodiode between the parts 4 and 4', through which channel the parts 4 and 4' are electrically connected to each other and the charges formed in the zone 4 by irradiation can flow to the output electrode 6 and can be measured at the output terminal U.

The capacitances between the gate electrodes 7, including their supply conductors, and the overlying output electrode 6 insulated therefrom by the oxide layer 16 (see FIG. 2) produce cross-talk, which yields an interference signal that cannot be distinguished from the signal to be measured. If the widths $b_1$ and $b_2$ were equal, the cross-talk capacitance for the photodiodes 12 and 14 connected to the band AB would be larger than for the photodiodes 11, 13 and 15 connected to the band CD because, due to the fact that the longitudinal sides of the zone 4 extend in the radial direction, these zones are wider at the area of the band AB than at the area of the band CD. Roughly, the surface area and hence the capacitance of the gate electrodes are larger for the diodes 12 and 14 approximately in the ratio $R_2/R_1$ than for the diodes 11, 13 and 15. The cross-talk interference signal will be larger for the diodes 12 and 14 to the same extent as for the diodes 11, 13 and 15. Due to the difference in magnitude of these interference signals of consecutive diodes, interference voltage pulses of alternating magnitude occur at the output electrode, whose enveloping alternating signal forms a non-negligible fraction of the signal to be measured.

From the point of view of circuit engineering it is favourable for the analysis of the signal if the interference voltage pulses for all diodes have the same magnitude and the enveloping signal consequently is a direct voltage signal. This is achieved in the photodetector according to the invention with good approximation in that $b_1/b_2$ is made approximately equal to $R_2/R_1$, as a result of which the cross-talk capacitances of the photodiodes connected to the band AB is equal with good approximation to that of the photodiodes connected to the band CD.

In a satisfactorily operating photodetector realized in practice, the number of photodiodes is two hundred and twenty. The width of the switching electrodes 7 consisting of polycrystalline silicon and of their supply conductors amounts to 8 $\mu$m, while $R_1 = 17$ mm and $R_2 = 18.8$ mm. In such a detector, if $b_1$ were equal to $b_2$, the difference in interference signals between consecutive photodiodes would be approximately 10%. In the construction according to the invention, this difference is considerably reduced.

The semiconductor body comprising the multiple photocell preferably also accommodates at least in part the electronic circuit for generating and processing the switching signals so that the entire photodetector constitutes a monolithic integrated circuit with a multiple photocell and associated peripheral electronics.

In the following example, an apparatus for measuring angular displacements of an object will be described in which a photodetector according to the invention is used.

In FIGS. 3 and 4, reference numeral 21 denotes a circular disk having a center M connected to an object (not shown), whose rotation has to be measured. This disk rotates about the axis aa'. The disk 21 may form part of a so-called goniometer, i.e. a manipulator by which a sample of a substance to be examined is arranged at a given angle to a beam of measurement radiation. Goniometers are used, for example, in spectrometers or microscopes operating with X-ray radiation. The disk 21 may alternatively form part of an angle sensor in a machine tool or a processing machine. The disk is provided with a pattern consisting of a plurality of equidistant reflecting strips 23, which alternate with non-reflecting, for example, transparent or radiation-absorbing strips 24. The pattern is illuminated with a beam 26 originating from a radiation source 25, for example, a light-emitting diode or a diode laser. A part of the beam 26 is reflected by a semi-transparent mirror 27 to the disk. The radiation source is arranged in the focal plane of a field lens 28, which renders the beam parallel. A part of the radiation reflected by the pattern 22 is transmitted by the mirror 27 to an objective system 29, which images the illuminated pattern of the measurement disk on a multiple photocell 30.

The multiple photocell 30 forms part of a photodetector according to the invention and comprises a comparatively large number of strip-shaped photodiodes 31, which are mutually separated by separation strips 32 in FIG. 5 and are divided into a comparatively small number of groups. Consequently, each group comprises a comparatively large number of photodiodes. The number of photodiodes per period of the imaged strip pattern 22 has to be, on the one hand, as large as possible in order to obtain an electrical reproduction of the optical signal as reliable as possible. On the other hand, the largest possible part of the strip pattern 22, which comprises, for example, seven hundred and twenty strip periods throughout its circumference, has to be scanned.

As shown in FIG. 5, the photodiodes 31 in the photodetector are arranged along a curve 33 having a radius of curvature $R'$, which is chosen so that the pattern of photodiodes corresponds to the image of the strips of the pattern 22 formed on the multiple photocell. With a magnification M of the objective system 29, it therefore holds that $R' = M \times R$, where R is the radius of curvature of the curve 34, along which the strips in the pattern 22 are arranged. Due to this measure, it is achieved that radiation originating from a reflecting strip 23 illuminates on the measurement disk 21 each time at most one photodiode 31 or one separation strip 32 and that upon rotation of the measurement disk all photodiodes are successively fully illuminated. Consequently, the angular rotation of the disk 21 and hence of the object connected thereto can be measured very accurately.

In a given embodiment of the multiple photocell 30, the number of photodiodes was two hundred and twenty and the length of each photodiode was 1.8 mm. The width of each photodiode amounted to 10 $\mu$m and the relative distance of the photodiodes was also 10 $\mu$m. The number of photodiodes per period of the pattern 22 consequently was so that the field of view comprised twenty-two periods of the pattern 22. Corresponding photodiodes of each set of ten consecutive photodiodes were connected to each other, which means that were ten groups of twenty-two photodiodes each.

A stationary strip pattern having a black-to-white ratio of 1:1 in the surface of the multiple photocell 30 is simulated by activating five consecutive groups of photodiodes. A travelling strip pattern is obtained if the activation of five groups is each time advanced by one group.

In the processing circuit shown block-diagrammatically in FIG. 6, the clock pulses 41 produced in the clock pulse generator 40 are supplied to a divider 42 and a divider 43. The divider 42 supplies pulses 44 controlling a ring counter 45. The multiple photocell 30 is activated by the ring counter 45 and produces the measurement signal 46. The divider 43 supplies pulses 47 (mostly having a different repetition frequency from the control pulses 44 from the divider 42) which form the reference signal. In the buffer counter 48, the measurement signal 46 and the reference pulses 47 are compared with each other. The output pulses of the buffer counter 48 are supplied, for example, to an indicator (not shown) through output leads 50.

The ring counter 45 activates the consecutive groups of photodiodes of the multiple photocell 30 so that a strip pattern apparently travels at a constant speed over the surface of the photocell 30. The period of this pattern is equal to that of the projection on the photocell 30 of the pattern 22. When the pattern 22 is stationary with respect to the photocell 30, the measurement signal has a constant frequency. When the projection of the pattern 22 moves in the same direction as the apparent pattern activated by the ring counter 45, the frequency of the measurement signal 46 decreases, whereas with a movement in the opposite direction the frequency of the measurement signal 46 increases. The direction and the magnitude of the displacement of the strip pattern 22 and hence of the displacement of the object can thus be determined.

As already stated above, a part of the processing circuit according to the block diagram of FIG. 6 can be included in the same semiconductor body as the multiple photocell.

It will be appreciated that the invention is not limited to the embodiments described. For example the photodiodes may comprise instead of p-type zones in an n-type semiconductor body also n-type zones in a p-type semiconductor body. The shield 6 serving as the output electrode may be constituted instead of by an aluminium layer also by another conductive layer. Furthermore, the diodes may be connected in groups in a manner different from that described or may not be connected in groups, depending upon the use in a measurement or regulation apparatus.

What is claimed is:

1. A photodetector for use in an angular displacement measurement apparatus comprising
    a semiconductor region of a first conductivity type having a plurality of strip-shaped photodiodes, said photodiodes being regions of a second opposite conductivity type,
    a plurality of p-n junctions disposed between said regions of first and second conductivity type,
    said photodiodes having ends located on two concentric arcs of a circle, said photodiodes having longitudinal sides extending in a radial direction, and said photodiodes being separated at similar distances in a tangential direction,
    a first output electrode connected to one end of alternate consecutive photodiodes and a second output electrode connected to opposite ends of remaining alternate photodiodes,
    an image-defining shield of a conductive layer provided above said photodiodes, said shield being impervious to radiation, and said shield covering ends of said photodiodes,
    said shield having an opening to expose a main portion of said photodiodes, said opening having opposite edges concentric with said two concentric arcs of a circle,
    said shield having bands adjoining said opposite edges of said opening, said bands having respective constant widths, said widths having a ratio substantially inversely proportional to a ratio of radii of curvature of center lines of said bands such that cross-talk of adjacent photodiodes is minimized, and
    a field effect transistor having an insulated gate electrode positioned adjacent to one of said first and second output electrodes, said field effect transistor connecting said one of said first and second output electrodes of each photodiode.

2. A photodetector according to claim 1, wherein electronic circuit means are disposed at least in part in said semiconductor region for generating and processing switching signals.

3. A photodetector according to claim 1 or claim 2, wherein said bands have widths of $B_1$ and $B_2$, where $B_1 > B_2$.

4. An apparatus for measuring angular displacement of an object comprising a circular measurement disk mechanically connect to an object, a pattern of alternate first and second strips disposed on said measurement disk, said first strips extending in a radial direction on said circular measurement disk, and said first strips alternating with said second strips in a tangential direction, said first and said second strips having different optical properties, radiation source means for illuminating said pattern of alternate strips, and photodetector means for converting radiation from said pattern of alternate strips into electrical signals, said photodetector means comprising a semiconductor region of a first conductivity type having a plurality of strip-shaped photodiodes, said photodiodes being regions of a second opposite conductivity type, a plurality of p-n junctions disposed between said regions of first and second conductivity type, said photodiodes having ends located on two concentric arcs of a circle, said photodiodes having longitudinal sides extending in a radial direction, and said photodiodes being separated at similar distances in a tangential direction, a first output electrode connected to one end of alternate consecutive photodiodes and a second output electrode connected to opposite ends of remaining alternate photodiodes, an image-defining shield of a conductive layer provided above said photodiodes, said shield being impervious to radiation, and said shield covering ends of said photodiodes, said shield having an opening to expose a main portion of said photodiodes, said opening having opposite edges concentric with said two concentric arcs of a circle, said shield having bands adjoining said opposite edges of said opening, said bands having respective constant widths, said widths having a ratio substantially inversely proportional to a ratio of radii of curvature of center lines of said bands such that cross-talk of adjacent photodiodes is minimized, and a field effect transistor having an insulated gate electrode positioned adjacent to one of said first and second output electrodes, said field effect transistor connecting said one of said first and second output electrodes to each photodiode.

5. A photodetector according to claim 4, wherein electronic circuit means are disposed at least in part in said semiconductor region for generating and processing switching signals.

6. A photodetector according to claim 4 or claim 5, wherein said bands have widths of $B_1$ and $B_2$, where $B_1 > B_2$.

* * * * *